US007860089B2

(12) United States Patent
Tripathi et al.

(10) Patent No.: US 7,860,089 B2
(45) Date of Patent: *Dec. 28, 2010

(54) METHOD AND SYSTEM FOR NETWORK BASED CALL-PICKUP

(75) Inventors: Anoop Tripathi, Naperville, IL (US);
David A. Grabelsky, Skokie, IL (US);
Guanglu Wang, Kildeer, IL (US)

(73) Assignee: Hewlett-Packard Company, Palo Alto, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 12/174,043

(22) Filed: Jul. 16, 2008

(65) Prior Publication Data

US 2008/0298361 A1   Dec. 4, 2008

Related U.S. Application Data

(63) Continuation of application No. 10/610,521, filed on Jun. 30, 2003, now Pat. No. 7,417,988.

(51) Int. Cl.
*H04L 12/56* (2006.01)

(52) U.S. Cl. ........................ 370/389; 370/356
(58) Field of Classification Search ................ 370/352, 370/401, 353; 379/201, 207; 709/206
See application file for complete search history.

(56) References Cited

U.S. PATENT DOCUMENTS

| | | | |
|---|---|---|---|
| 5,095,504 A | 3/1992 | Nishikawa et al. | |
| 6,148,193 A | 11/2000 | Miska et al. | |
| 6,477,150 B1 | 11/2002 | Maggenti et al. | |
| 6,584,093 B1 | 6/2003 | Salama et al. | |
| 6,714,987 B1 | 3/2004 | Amin et al. | |
| 6,738,390 B1 | 5/2004 | Xu et al. | |
| 6,768,722 B1 | 7/2004 | Katseff et al. | |
| 6,804,332 B1 | 10/2004 | Miner et al. | |
| 6,847,632 B1 | 1/2005 | Lee et al. | |
| 6,885,658 B1 | 4/2005 | Ress et al. | |
| 6,937,597 B1 * | 8/2005 | Rosenberg et al. | 370/356 |
| 6,970,909 B2 * | 11/2005 | Schulzrinne | 709/206 |

(Continued)

OTHER PUBLICATIONS

Johnston, A. et al. "Session Initiation Protocol Service Examples: Draft-IETF-Service-Examples"; Internet Engineerign Task Force (IETF), Internet-Draft <http://www.ietf.org/internet-drafts/draft-ietf-sipping-service examples-04.txt>, May 28, 2003.

(Continued)

*Primary Examiner*—Thong H Vu (57) ABSTRACT

A method and system for network based call-pickup is provided. In one embodiment a first user agent communicates in a communication session with a second user agent in a network telephony system. The second user agent may request that a third user agent replace the second user agent in the communication. The third user agent may be a park server, and when it replaces the second user agent, the communication session may thereby be parked at the park server. A fourth user agent may then request that the third user agent (e.g., park server) initiate a communication session between the first user agent and the fourth user agent. The third user agent may then instruct the first user agent to communicate with the fourth user agent. The parked communication session may thereby be picked up by the fourth user agent.

19 Claims, 5 Drawing Sheets

U.S. PATENT DOCUMENTS

| | | |
|---|---|---|
| 7,002,973 B2 | 2/2006 | MeLampy et al. |
| 7,002,989 B2 | 2/2006 | Agrawal et al. |
| 7,006,436 B1 | 2/2006 | Chu et al. |
| 7,028,335 B1 | 4/2006 | Borella et al. |
| 7,032,242 B1 | 4/2006 | Grabelsky et al. |
| 7,035,252 B2 | 4/2006 | Cave et al. |
| 7,050,423 B2 | 5/2006 | Schneider et al. |
| 7,065,070 B1 | 6/2006 | Chang |
| 7,076,568 B2 | 7/2006 | Philbrick et al. |
| 7,082,133 B1 | 7/2006 | Lor et al. |
| 7,139,380 B2 * | 11/2006 | Burger ................. 379/207.02 |
| 7,149,506 B2 | 12/2006 | Osterhout et al. |
| 7,180,912 B1 | 2/2007 | Samarasinghe |
| 7,180,984 B1 * | 2/2007 | Samarasinghe .......... 379/88.13 |
| 7,221,753 B2 * | 5/2007 | Hutton et al. .......... 379/265.11 |
| 7,283,519 B2 * | 10/2007 | Girard ....................... 370/353 |
| 7,417,988 B1 | 8/2008 | Tripathi et al. |
| 7,489,771 B2 * | 2/2009 | McMurry et al. ...... 379/201.01 |
| 2001/0036176 A1 | 11/2001 | Girard |
| 2001/0043571 A1 | 11/2001 | Jang et al. |
| 2002/0035647 A1 | 3/2002 | Brown et al. |
| 2002/0124100 A1 | 9/2002 | Adams |
| 2003/0097447 A1 | 5/2003 | Johnston |
| 2003/0145054 A1 | 7/2003 | Dyke |
| 2003/0185202 A1 | 10/2003 | Maenpaa |
| 2004/0196867 A1 | 10/2004 | Ejzak et al. |
| 2004/0240430 A1 * | 12/2004 | Lin et al. .................... 370/352 |
| 2005/0008024 A1 * | 1/2005 | Newpol et al. .............. 370/401 |
| 2006/0007940 A1 | 1/2006 | Sollee et al. |

OTHER PUBLICATIONS

Integrating Internet Telephony Services, W. Jiang et al., IEEE Jun. 2002.

* cited by examiner

METHOD AND SYSTEM FOR NETWORK BASED CALL-PICKUP

PRIORITY FROM U.S. PATENT APPLICATIONS

This application claims priority from and is a continuation of U.S. application Ser. No. 10/610,521, which was filed on Jun. 30, 2003, now U.S. Pat. No. 7,417,988 and which is hereby incorporated in its entirety by reference.

FIELD OF INVENTION

The present invention relates to network telephony services and, more particularly, to a method and system for network based call-pickup.

BACKGROUND

Internet protocol ("IP") telephony and IP multimedia networks employ several protocols to setup and manage calls and sessions. One of the most widely adopted protocols for IP-based signaling is the Session Initiation Protocol ("SIP"). SIP is used, for example, for initiating new calls and sessions, manipulating call paths, and enabling the association of services with users regardless of their point of connection in the network. These are just a few areas of application of the SIP.

The increasing use of SIP has spurred development and introduction of numerous services with SIP interfaces for user and network access. This approach makes sense as the number of SIP-capable devices proliferates in IP networks. These devices have several features and mechanisms defined to employ existing telephony features in SIP.

One such feature is call-pickup. Call-pickup is a commonly used feature in today's deployed telephony solutions, especially in office environments. As an example, consider User A and User B being in a telephony conversation and User B wants to move to another location during the conversation. Suppose it is not possible to physically move the device being used by User B to the new location, and also that User B does not want to hang up the call and fully re-originate the call for any particular reason. User B may transfer the call to a device (or server) called a "park server" that temporarily holds (or "parks") the call, allowing User B's device to disconnect without releasing the call. User B may subsequently retrieve the parked call. Therefore, User B presses a button(s) on the device that parks the call at a park server. User B then moves to the new location and retrieves the parked call by calling User A. This process of call retrieval is referred to as call-pickup.

Unfortunately, however, existing SIP-based call-pickup solutions have several drawbacks. For example, one solution requires User B to re-originate the call at the new location by sending a call-pickup origination request to User A. Therefore, in this solution, although the call will be parked in a normal fashion for User A (e.g., similar to generally accepted call park functions), User B essentially hangs up and recalls User A to park and pickup the call. One problem with this technique is that this requires advanced feature handling in a handset device so that the handset at the new location has the capability of sending detailed call-pickup origination requests. Such a feature does not exist in most of the commercially available SIP devices. Therefore, using this solution would require upgrades of most handsets in the network.

In addition, in existing solutions when picking-up the call at the new location, User B simply re-originates a call with User A, so User B must know the SIP address of User A. This may not be known if User A is calling from a payphone and does not know the phone number of the payphone or if User A is an anonymous caller, for example. Another related problem is that User A must have the capability to receive multiple calls because for a limited duration, User A will be in two calls (i.e., the call with the park server, and the call from User B from the new location). Still another related problem is that User B may incur additional charges for re-originating a call with User A from the new location. The proposed solution further assumes that from the new location, User B will have calling privileges to call User A.

Furthermore, a major problem with the proposed solution is that service providers have no control over this call-park/call-pickup feature. The park server is provided for parking the call. However, the park server is not involved in the pickup process except for being asked to disconnect the parked call because User B picks up the call by re-originating a call with User A from the new location (e.g., User B simply calls User A again from the new location). The parked call (i.e., the communication session between User A and the park server) can be dropped due to any reason (e.g., User A getting impatient and hanging up). So it is difficult for the service provider to know whether a successful call-pickup occurred. This implies that the service provider will have difficulty charging for the call-pickup feature and may have no incentive to provide this service. Therefore, the currently proposed solution is unlikely to be deployed.

SUMMARY

In an exemplary embodiment, a method is provided that includes a first user agent receiving a request from a second user agent to initiate a communication session between the second user agent and a third user agent. In this method, the first user agent is in communication with the third user agent. The method further includes, responsive to the request, instructing the third user agent to communicate with the second user agent. The method may be carried out between SIP user agents within a network telephony system, for example. For instance, the method may be carried out between a SIP park server and two SIP-based user agents.

In another respect, the exemplary embodiment may take the form of a method carried out within a SIP based network telephony system in which a first user agent is communicating with a second user agent in a communication session. The method may include the first user agent parking the communication session at a park server, and a given user agent picking up the communication session by calling into the park server.

In still another respect, the exemplary embodiment may take the form of a SIP based entity that includes a first user agent and a second user agent. The first user agent may be in communication with a first communication device. The second user agent may receive from a second communication device a SIP request to initiate a communication session between the first communication device and the second communication device, and may re-issue the SIP request to the first communication device instructing the first communication device to communicate with the second communication device.

In yet another respect, the exemplary embodiment may take the form of a network telephony system that includes a first user agent communicating with a second user agent in a communication session. The system also includes a park server that may replace the first user agent in the communication session and, in response to a request to initiate a communication session between a third user agent and the second user agent, to instruct the second user agent to communicate with the third user agent.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

In an exemplary embodiment, a method of network based call pickup is provided. A user may park a call at a park server and then move to a new location (or simply park the call to place the call on hold while the user remains at the user's current location). The user may then pickup the call by calling into the park server, instead of calling the user who is parked at the park server. The park server will responsively connect the two users again. This method may not require any advanced feature handling in the handset devices. The park server maintains the call-park and call-pickup functionality. In addition, service providers have control over this call-park/call-pickup feature. Therefore, the service providers can monitor and manage this network telephony feature.

As an example in a SIP-based network, suppose User A and User B are in conversation (through a communication session). User B may park the call by sending a SIP REFER message to the park server. The server will then send a SIP INVITE message to User A that causes the park server to replace User B in the communication session. User A accepts the replacement and User A sends a SIP BYE message to user B. User A is now parked at the park server. User B receives notification of the successful park and receives a call pickup number. Suppose User B then moves to a new location and dials the call pickup number to pickup the parked call. This results in a call set-up process between the park server and User B at the new location. The park server sends a SIP re-INVITE message to User A to cause User A to change its Real Time Transport Protocol ("RTP") destination to the new location of User B. Then SIP OK (connect) and SIP ACK (acknowledge) messages are exchanged between User A and User B at the new location and the call is effectively "picked-up."

Figure 1:
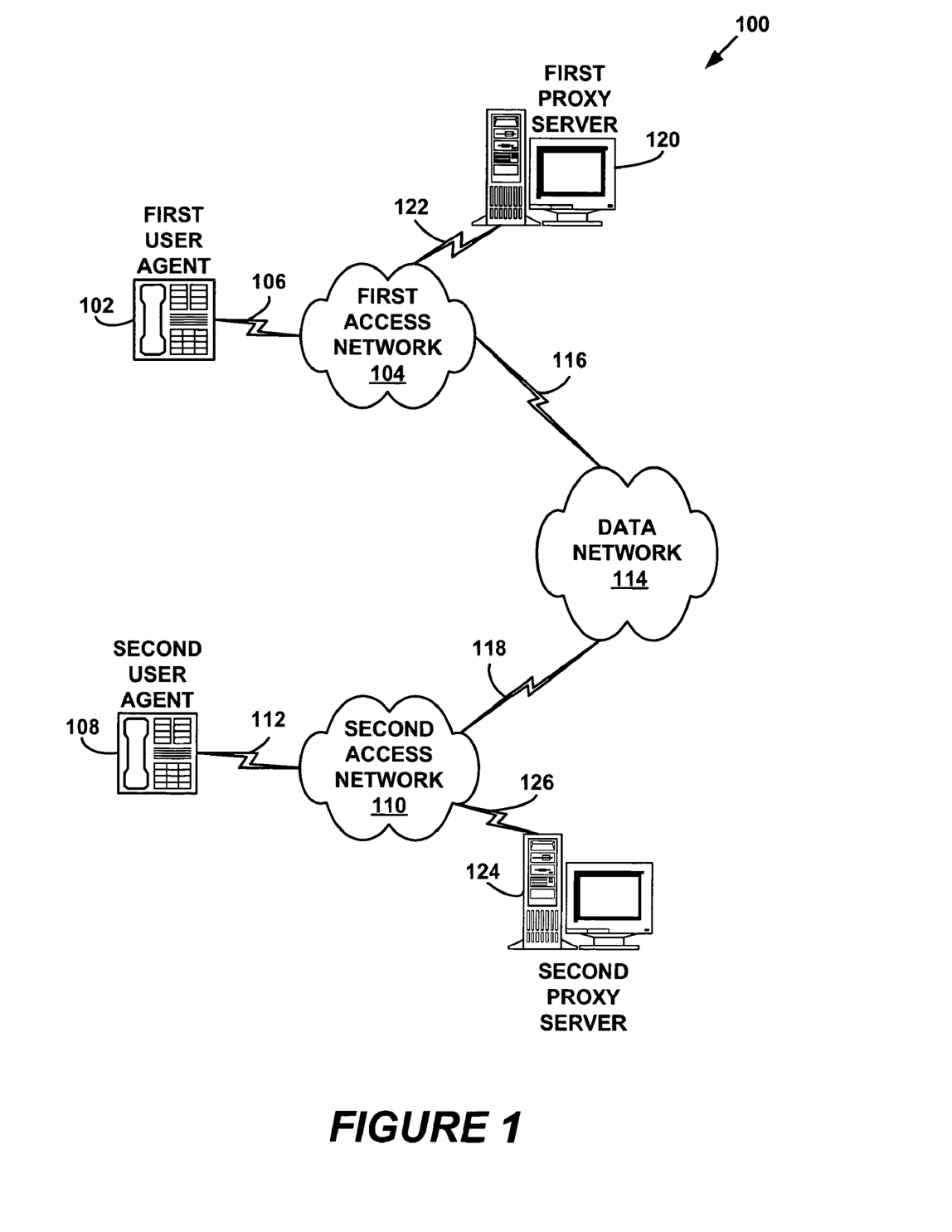
FIG. 1 is a block diagram illustrating one embodiment of a network telephony system according to the present invention.

Referring now to the figures, and more particularly to FIG. 1, a block diagram of one embodiment of a network telephony system 100 is illustrated. It should be understood that the system 100 illustrated in FIG. 1 and other arrangements described herein are set forth for purposes of example only, and other arrangements and elements can be used instead and some elements may be omitted altogether, depending, for example, on manufacturing and/or consumer preferences.

By way of example, the system 100 includes a first user agent 102 communicatively linked to a first access network 104 through a link 106. A second user agent 108 is linked to a second access network 110 through a link 112. Network entities on the first access network 104 may communicate with network entities on the second access network 110 through a data network 114, such as the public Internet or other transport network, linking the first access network 104 to the second access network 110 by links 116 and 118, respectively. A first proxy server 120 linked to the first access network 104 through link 122 and a second proxy server 124 linked to the second access network 110 through link 126 may be used to perform routing of signaling requests and responses. The links shown in the system 100 may be hardwired or wireless links, and they may include intermediate network entities and/or networks. For example, the links 116 and 118 may contain various configurations of gateways and/or routers. In addition, the system 100 may also include other servers, such as registration servers, redirect servers, directory servers, park servers, and/or location servers. In addition, one or more of these server types may be combined into one physical device.

The first and second user agents 102 and 108 may be device types that communicate through the data network 114. In an exemplary embodiment, the user agents 102 and 108 are SIP-based network phones. Although the user agents 102 and 108 are shown to be network phones, other implementations may also be used. For example, the user agents 102 and 108 may be personal computers with software to perform SIP user agent functions, and user interface hardware, such as a microphone and headphone to communicate voice information. Other user interfaces, such as video and/or other types of communication data, may also be used, whether the devices use wired or wireless communication techniques. In addition, more user agents may be included in the system 100.

The first and second user agents 102 and 108 may receive calls from each other. In addition, they may receive calls from devices on other types of communication networks, such as from telephones located on the Plain Old Telephone System ("POTS") when appropriate gateways are implemented in the system 100.

The first and second access networks 104 and 110 may be any type of networks that connect the user agents 102 and 108 to the data network 114. For example, the first and second access networks 104 and 110 may be wide area networks ("WAN"), local area networks ("LAN"), or others.

The first and second proxy servers 120 and 124 may be intermediate devices that receive requests from the user agents 102 and 108 and then forward the requests on the agents' behalf. For example, the first and second proxy servers 120 and 124 may receive SIP messages and forward them towards the current location of the callee, either directly to the callee or to another server that might be better informed about the actual location of the callee. The first and second proxy servers 120 and 124 can provide functions such as authentication, authorization, network access control, routing, reliable request retransmission, and security. The first and second proxy servers 120 and 124 can either be stateful or stateless. A stateful proxy holds information about the call during the entire time the call is up, while a stateless proxy processes a message without saving information contained in the message. Furthermore, the first and second proxy servers 120 and 124 can be either forking or non-forking. A forking proxy can, for example, ring several phones at once until somebody takes the call.

The system 100 may include other types of servers as well, such as a redirect server, a directory server, a registrar server, a park server, and a back-to-back user agent ("B2BUA"). For instance, redirect servers may be used to process messages by sending back the address where a callee is reachable. Registrar servers are then used to record an address and the associated IP address of the callee, for example.

Further, a B2BUA is an entity that performs as a server on one side, including the termination of incoming requests, and as a client on the other side by re-issuing receiver requests. Such entities are often useful, if a provider needs to maintain session information or wants to manipulate some of the contents of SIP messages, for example.

The various network server types may be combined into a single server or may be co-located. Not all server types are needed to implement the various embodiments of the present invention. For instance, in the example illustrated in FIG. 1, only proxy servers are shown. The communication services to be provided, or requested by a user, will determine which servers are present in the communication system. The present invention may be implemented in systems of varying complexity, with different combinations of server types and quantities.

SIP Overview

In the exemplary embodiment, a signaling protocol used in the system 100 is the Session Initiation Protocol ("SIP") signaling protocol. SIP is described in Handley, et al., "SIP: Session Initiation Protocol," Internet Engineering Task Force Request For Comments 2543 (IETF RFC 2543), March 1999, which is entirely incorporated by reference herein, as if fully set forth in this description. The SIP is also described in Rosenberg et al., "SIP: Session Initiation Protocol," IETF RFC 3261, June 2002, the contents of which are fully incorporated herein by reference, as if fully set forth in this description. Other signaling protocols, such as H.323, the Media Gateway Control Protocol ("MGCP"), the Media Gateway Control Protocol ("MEGACO"), and other standard or proprietary techniques may alternatively be used. RFC 3508 that describes the H.323 protocol, RFC 2705 that describes the MGCP, and RFC 3015 that describes the MEGACO are each entirely incorporated by reference herein, as if fully set forth in this description.

The SIP describes how to set up Internet telephone calls, videoconferences, and other multimedia connections. SIP can establish two-party sessions (ordinary telephone calls), multiparty sessions (where everyone can hear and speak), and multicast sessions (one sender, many receivers). The sessions may contain audio, video, or data. SIP handles call setup, call management, and call termination and may use other protocols to do so, such as RTP for transporting real-time data and providing Quality of Service ("QoS") feedback, and the Real-Time Streaming Protocol ("RTSP") for controlling delivery of streaming media. (RFC 1889 that describes RTP and RFC 2326 that describes RTSP are both entirely incorporated by reference herein, as if fully set forth in this description). SIP is an application layer protocol and can run over the user datagram protocol ("UDP") or the transport control protocol ("TCP"), for example.

SIP supports a variety of services, including locating the callee, determining the callee's capabilities, and handling the mechanics of call setup and termination, for example. SIP defines telephone numbers as uniform resource locators ("URLs"), so that Web pages can contain them, allowing a click on a link to initiate a telephone call (similar to the mailto function that allows a click on a link to initiate a program to send an e-mail message). For example, John_Doe@3Com.com may represent a user named John at the host specified by the domain name system ("DNS") of 3Com. SIP URLs may also contain other addresses or actual telephone numbers.

The SIP protocol is a text-based protocol in which one party sends a message in American standard code for information interchange ("ASCII") text consisting of a method name on the first line, followed by additional lines containing headers for passing parameters. Many of the headers are taken from multipurpose Internet mail extensions ("MIME") to allow SIP to interwork with existing Internet applications.

As an example, consider the following exemplary text encoded message.

```
INVITE sip:user@biloxi.com SIP/2.0
Via: SIP/2.0/UDP pc33.atlanta.com;branch=z9hG4bK776asdhds
Max-Forwards: 70
To: User <sip:user@biloxi.com>
From: Sender <sip:sender@atlanta.com>;tag=1928301774
Call-ID: a84b4c76e66710@pc33.atlanta.com
CSeq: 314159 INVITE
Contact: <sip:sender@pc33.atlanta.com>
Content-Type: application/sdp
Content-Length: 142
```

The first line of this text-encoded message contains the method name (e.g., INVITE). The lines that follow are a list of header fields. For example, the header fields are Via (describing the address at which the user is expecting to receive responses), To (contains a display name or SIP request-URI towards which the request was originally directed), From (contains a display name and a SIP request-URI that indicate the originator of the request), Call-ID (contains a globally unique identifier for this call), CSeq (a traditional sequence number), Contact (contains a SIP request-URI that represents a direct route to contact the sender), and Content-Type (information about the type of session that should be established, e.g., the Session Description Protocol ("SDP"), which describes parameters like type of media streams). In addition, the From header also has a tag parameter containing a random string (e.g., 1928301774) that is used for identification purposes.

Other example methods are provided below in Table 1.

TABLE 1

| METHOD | DESCRIPTION |
|---|---|
| INVITE | Request initiation of a session |
| ACK | Confirm that a session has been initiated |
| BYE | Request termination of a session |
| OPTIONS | Query a host about its capabilities |
| CANCEL | Cancel a pending request |
| REGISTER | Inform a redirection server about the user's current location |
| NOTIFY | Indicates the status of a request |
| REFER | Requests that the party sending the REFER be notified of the outcome of the referenced request |

Figure 2:
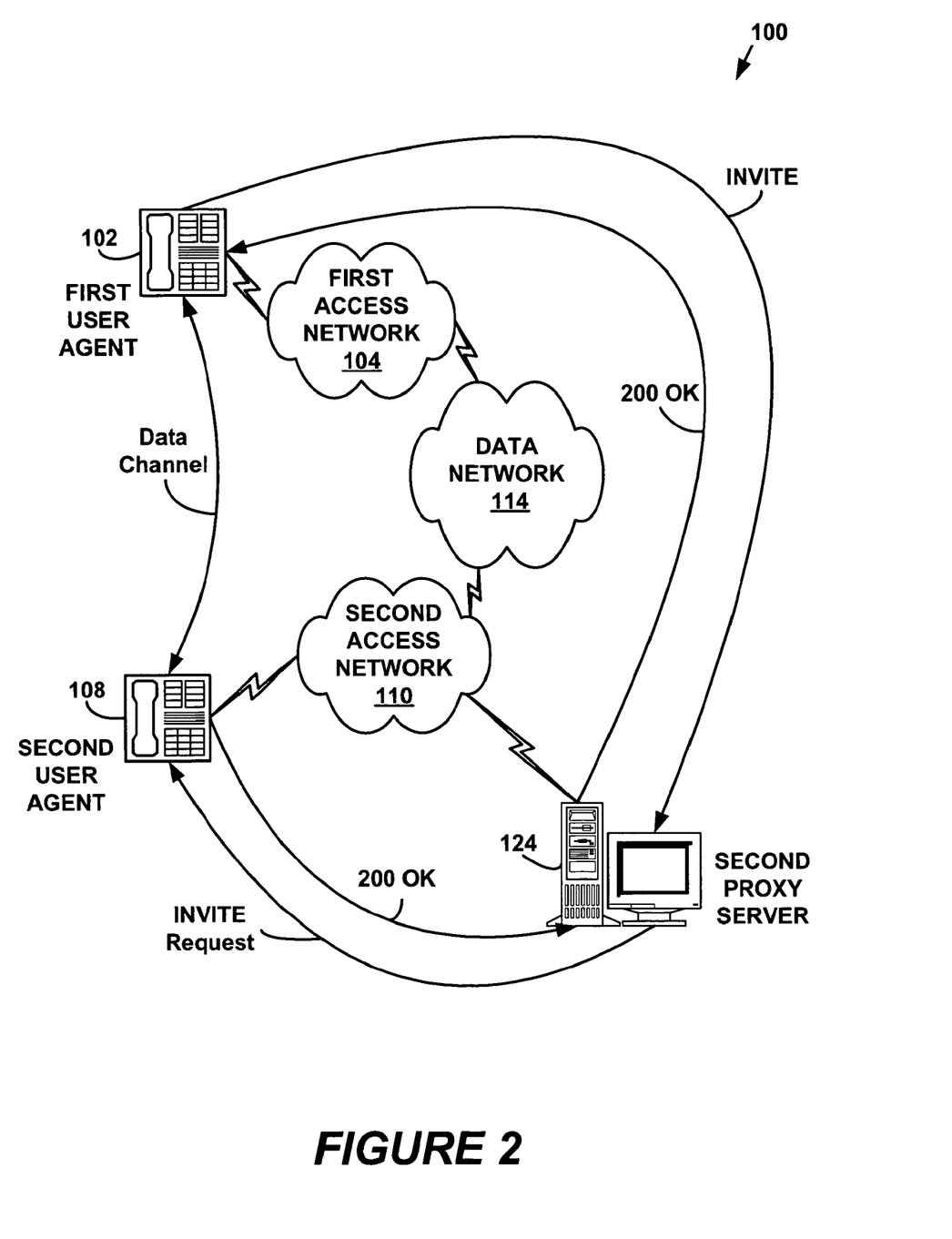
FIG. 2 is a simplified block diagram with message flow indicators illustrating a network telephony system according to an exemplary embodiment of the present invention.

FIG. 2 is a simplified block diagram with message flow indicators illustrating signaling within the network telephony system 100. For the example shown in FIG. 2, the SIP signaling protocol will be used. Other signaling protocols may also be used. The first proxy server 120 (and its associated link 122) are omitted for purposes of this illustration.

The first user agent 102 ("the caller") may call the second user agent 108 ("the callee"). To establish a call session, the caller sends an INVITE message to the callee by way of the second proxy server 124. The transport protocol for the transmission may be TCP or UDP, for example. In both cases, the headers on the second and subsequent lines of INVITE messages describe the structure of the message body, which contains the caller's capabilities, media types, and formats. The INVITE message also contains a user identifier to identify the callee, a caller user identifier to identify the caller, and a session description that informs the called party what type of media the caller can accept and where the caller wishes the media data to be sent. User identifiers in SIP requests are known as SIP addresses. SIP addresses are referred to as SIP Universal Resource Indicators (SIP request-URIs), which are of the form sip: user@host.domain. Other addressing conventions may also be used.

The first user agent 102 transmits the INVITE message to the second proxy server 124 located on the second access network 110. The second proxy server 124 will read the INVITE message and may use a location service locally or remotely located to determine the location of the callee, as identified in the INVITE message. For example, the callee may have recently moved from one location to a second location (which may be on the second access network 110 or elsewhere). The second proxy server 124 determines the location of the callee by matching the SIP request-URI in the INVITE message to one within a location database, which may be within the second proxy server 124 or connected to the second proxy server 124. If the SIP request-URI in the INVITE message does not exactly match any in the database, the second proxy server 124 may simply ignore the message. However, the second proxy server 124 can also perform directory service functions to resolve the unknown SIP request-URI as described in the commonly owned U.S. patent application Ser. No. 10/409,294, "Method and System For Providing Directory Based Services," which is incorporated by reference and to which the reader is referred for further description.

When the second proxy server 124 determines that the callee is located at the second user agent 108, the second proxy server 124 transmits an INVITE request to the second user agent 108. The INVITE request may simply be a forwarded version of the INVITE message, containing the SIP addresses of the caller and the callee. Upon receiving the INVITE request, the second user agent 108 may transmit a response message (ACK) to the second proxy server 124. The second proxy server 124 may then transmit a response message (ACK) back to the first user agent 102.

The response messages may be reply codes. A reply code may be a three-digit number with a classification as defined below in Table 2.

TABLE 2

| CODE | MEANING | EXAMPLES |
| --- | --- | --- |
| 1xx | Information | 100 = server agrees to handle client's request |
| 2xx | Success | 200 = request succeeded |
| 3xx | Redirection | 301 = page moved |
| 4xx | Client Error | 403 = forbidden page |
| 5xx | Server Error | 500 = internal server error |
| 6xx | Global Failure | 600 = busy everywhere |

For example, if the callee accepts the call, the callee responds with a 200 OK message. Following the reply code line, the callee also may supply information about the callee's capabilities, media types, and formats.

If the transmitted response message is a success response as shown in FIG. 2 (i.e. represented by a SIP "200 OK" response), then first user agent 102 may send an ACK message (not shown) back to the second user agent 108 to confirm receipt of the 200 OK message and complete the call initiation process. The ACK message may be sent through the same path as the INVITE request and response messages, or the ACK message may be sent directly from the first user agent 102 to the second user agent 108 through the data network 114, bypassing the second proxy server 124. After the call has been initiated using the SIP signaling protocol, the call is connected and media data (including voice information, etc.) can flow on a data channel between the first user agent 102 and the second user agent 108 through the access and data networks.

Other methods described in Table 1 can be used throughout the call session. For example, either party may request termination of a session by sending a message containing the BYE method. When the other side acknowledges the BYE method, the session is terminated. As another example, the OPTIONS method may also be used to query a user agent about its own capabilities. The OPTIONS method is typically used before a session is initiated to determine if that user agent is even capable of voice over Internet protocol ("VoIP"), or whatever type of session is being contemplated.

Furthermore, the REGISTER method relates to SIP's ability to track down and connect to a user whose location may not be associated with a single, fixed phone or client device. This message is sent to a SIP location server to inform the location server of who is where. That server can later be queried to find a user's current location. The user agents 102 and 108 have pre-programmed device identifiers (e.g. phone numbers), represented as SIP request-URI's that are of the form sip: user domain. An example is sip: 1234567890@sample.com. After power-up, each of the user agents 102 and 108 may send a SIP REGISTER message to the default registrar to inform the registrar of the agents' address and location.

Referring back to FIG. 1, the default registrar for the first network phone 102 may be the first proxy server 120, while the second network phone 108 may register with the second proxy server 124. When a call arrives at the proxy server for any of the registered SIP request-URIs, the proxy server will forward the call to the appropriate destination. If a network phone is moved to a new location, all calls to the associated SIP request-URI will still be properly routed to that device. Alternatively, if a user moves to a different phone, that user may inform the proxy server of the location of the new phone, so that the user's SIP request-URI may be mapped to that new phone. In other words, the system 100 provides device mobility since calls will "follow" the network phone or the user according to the network phone's or user's SIP request-URI. This is useful if the network phone 102 or 108 is running the Dynamic Host Configuration Protocol ("DHCP") so that when the location is changed, the IP address is also automatically changed.

Network Based Call Pickup for Parked Calls

In an exemplary embodiment, if the user moves to a different phone during a network telephone conversation and parks the call at a park server, the user may retrieve the call by calling into the park server. In this manner, the park server may control the call-park and call-pickup features of a telephony network. For example, in a SIP based network telephony system in which a first user agent is communicating with a second user agent in a communication session, the first user agent may park the call (i.e., communication session) at a park server. The first user may then move to a new location and pick up the communication session by calling into the park server causing the park server to instruct the second user agent to reinitiate the communication session with the first user at the new location.

Figure 3:
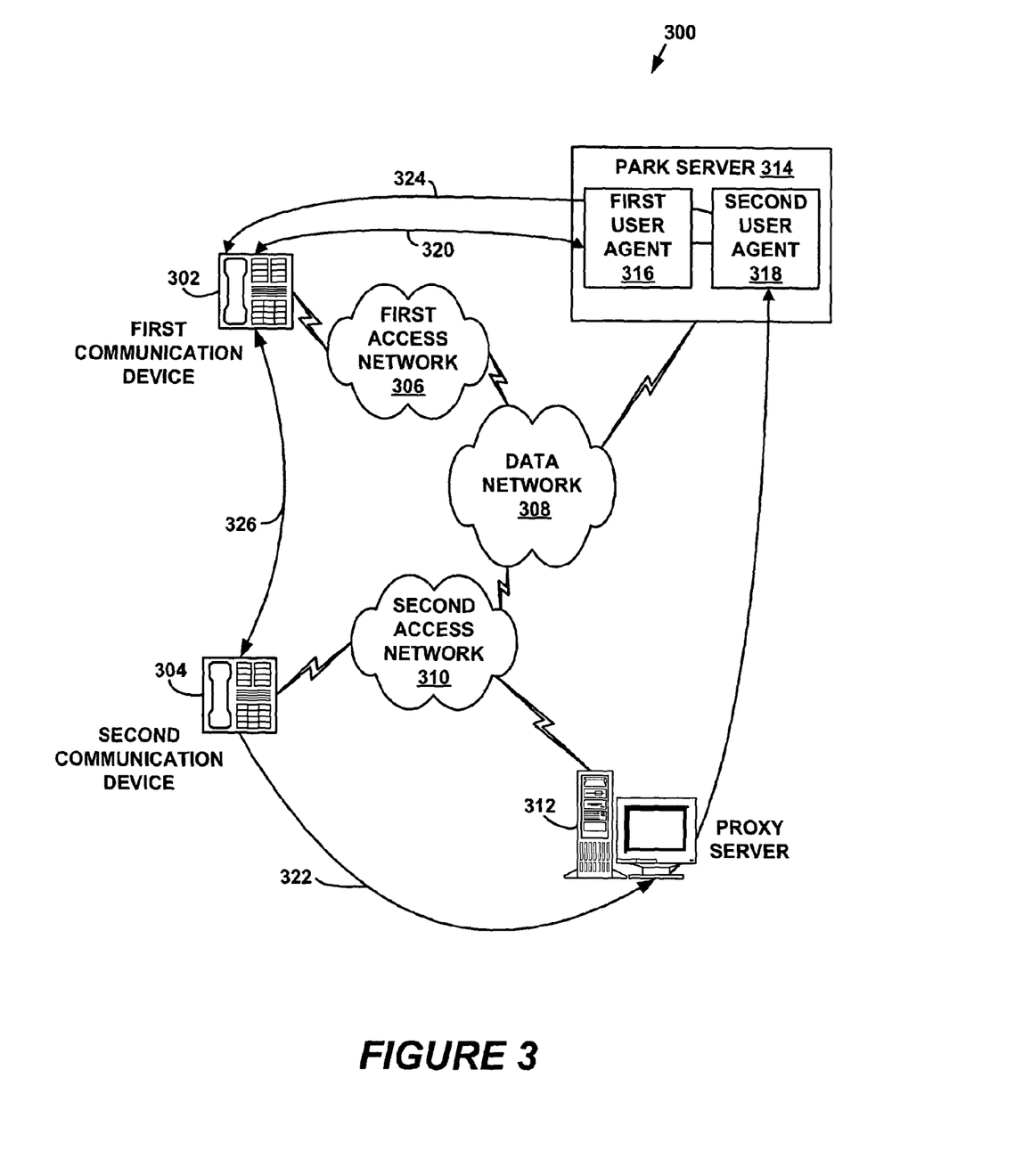
FIG. 3 is another simplified block diagram with message flow indicators illustrating a network telephony system according to an exemplary embodiment of the present invention.

FIG. 3 is simplified block diagram with message flow indicators illustrating a network telephony system 300 according to an exemplary embodiment of the present invention. The system 300 includes a first communication device 302 that may communicate with a second communication device 304 through a first access network 306, a data network 308 and a second access network 310. The system also includes a proxy server 312 to determine locations of the first communication device 302 and the second communication device 304. The system further includes a park server 314 coupled to the data network that includes a first user agent 316 coupled to a second user agent 318. In this illustration, the first communication device 302 and the second communication device 304 are SIP user agents, such as SIP based network telephones, and signaling between the devices 302 and 304 may be carried out according to SIP. However, other devices and other protocols may be used as well.

In the example illustrated in FIG. 3, a communication session with the first communication device 302 has been parked at the park server 314. Therefore, the first communication device 302 is in communication with the first user agent 316 of the park server 314 through an RTP media stream 320. The second communication device 304 may pick up the parked communication session by sending a message 322 to the second user agent 318 through the proxy server 312 to inform the second user agent 318 that the second communication device 304 wants to initiate a communication session with the first communication device 302. The second user agent 318 will then re-issue this request message through the first user agent 316 to the first communication device 302, as shown by message 324, instructing the first communication device 302 to communicate with the second communication device 304. The first communication device 302 will then change its RTP media destination to be from the first user agent 316 to the second communication device 304, and establish an RTP media stream 326 with the second communication device 304 through the access and data networks. Note that message 322 from the second communication device 304 to the second user agent 318 may alternatively be sent directly, without invoking the services of the proxy server 312.

In the exemplary embodiment, the park server 314 is a Back-to-Back-User-Agent ("B2BUA"). A B2BUA is SIP based logical entity, or logical element, that can receive and process SIP INVITE messages as a SIP User Agent Server ("UAS"). The B2BUA also functions as a SIP User Agent Client ("UAC") that determines how the request should be answered and how to initiate outbound calls. For example, a B2BUA can make a call out to two different parties and then connect them. The B2BUA functions as a bridge between the two parties and the B2BUA can control signaling between the two parties. The internal connection of the two parties within the B2BUA can be accomplished in a variety of ways, such as through any non-SIP based logic, or other service logic, for example. This provides for customized call control between the two parties. Unlike a SIP proxy server, the B2BUA maintains call state and participates in all call requests.

The park server 314 includes two SIP user agents working back-to-back, which control the calls going through the park server 314. One user agent receives a SIP request, possibly transforms the SIP request and then has the other user agent re-issue the SIP request. In a SIP telephony network, such as network 300, signaling between two user agents (e.g., the first communication device 302 and the second communication device 304) is restricted according to SIP. But, by implementing the park server 314 as a B2BUA, customized call control features can be implemented. For example, the signaling between the first communication device 302 and the first user agent 316 may be restricted to SIP, and the signaling between the second communication device 304 and the second user agent 318 may be restricted to SIP. However, the signaling between the first user agent 316 and the second user agent 318 is unrestricted and can implement many features outside the realm of SIP. For instance, in the exemplary embodiment, a park service is provided by the park server 314, allowing calls to be parked at the park server 314 and subsequently retrieved from the park server 314 by simply contacting the park server 314. In contrast, existing SIP call-park/pickup solutions require a device to contact the parked device that then must control signaling with the park server to retrieve a parked call. In addition, the exemplary embodiment does not require new feature capabilities in the end devices to implement the call park service, as may be required by existing proposed solutions.

Note that the use of a B2BUA is not the only method by which the park server, or other services, could be implemented. However, because a B2BUA can terminate both the signaling and media portions of call legs between other SIP user agents, the B2BUA is able to introduce flexibility in which services can be implemented.

Figure 4:
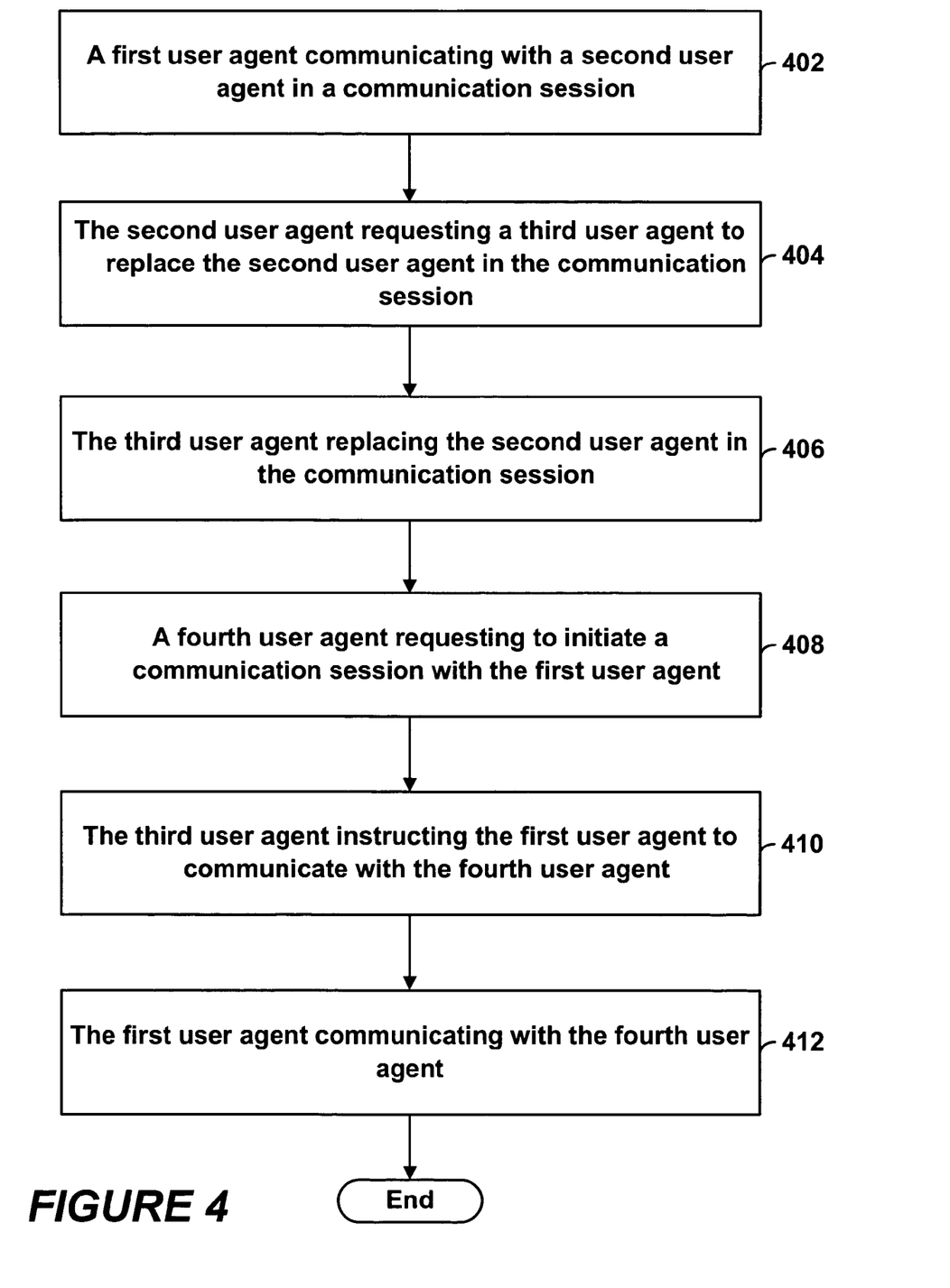
FIG. 4 is a flowchart depicting one embodiment of a method of call-park and call-pickup within a network telephony system according to the exemplary embodiment.

FIG. 4 is a flowchart depicting one embodiment of a method of call-park and call-pickup within a network telephony system, such as system 300, according to an exemplary embodiment. Initially, a first user agent may be communicating with a second user agent in a communication session, as shown by block 402. For example, the first communication device 302 may be communicating with the second communication device 304. The second user agent may then wish to park the communication session and may do so by requesting a third user agent to replace the second user agent in the communication session, as shown by block 404. For example, the second communication device 304 may request the park server 314 to communicate with the first communication device 302 in the communication session in place of the second communication device 304. The third user agent, e.g., the park server 314, may then replace the second user agent in the communication session, as shown by block 406. The second user agent has thus parked the communication session with the third user agent. The third user agent may now play music through an RTP media stream connection with the first user agent while the call is parked, for example.

Now, suppose a fourth user agent requests to initiate a communication session with the first user agent, as shown by block 408. For example, the fourth user agent may contact the park server 314 and request the park server 314 to establish a communication session between the fourth user agent and the first user agent in order to pickup the parked call. The third user agent, e.g., park server 314, will then instruct the first user agent to communicate with the fourth user agent, as shown by block 410. Subsequently, the first user agent will then communicate with the fourth user agent, as shown by block 412. Since the fourth user agent that wishes to pick up the call contacts the park server 314 to do so, the fourth user agent does not need to know the address of the first user agent (i.e., the user agent that is parked). This allows calls from unknown users that have unknown addresses, e.g., a user calling from a payphone, to be parked and successfully picked up.

Figure 5:
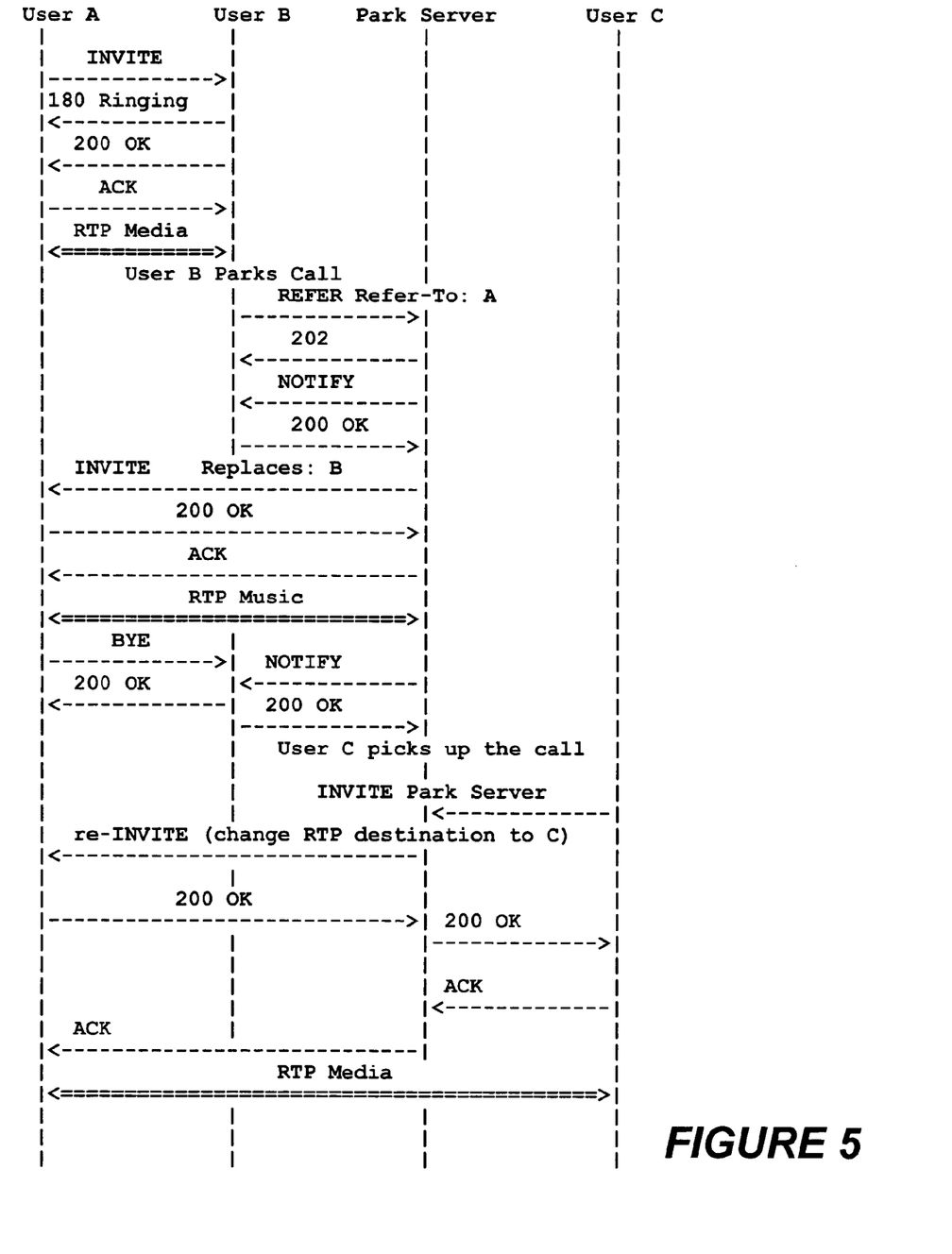
FIG. 5 is a message flow diagram illustrating one example of call-park and call-pickup within a network telephony system according to the exemplary embodiment.

FIG. 5 is a message flow diagram illustrating one example of call-park and call-pickup within a network telephony system according to the exemplary embodiment. The signaling within FIG. 5 may be used to carry out the method depicted in FIG. 4, for example. FIG. 5 illustrates User A, User B, User C, and a park server engaged in signaling, which may occur through any number of network transport elements, such as access networks, data networks, and proxy servers all of which are not shown for ease of illustration. Further, the example in FIG. 5 is illustrated using SIP. However, other protocols may also be used, such as the H.323 call control protocol. Also, for the example illustrated in FIG. 5, User A, User B, and User C are SIP-based network phones.

In the example illustrated in FIG. 5, User A initiates a communication session with User B by sending an INVITE message to User B. User B sends a 180 response message to User A to indicate ringing. Once User B accepts the INVITE, User B sends a 200 OK message to User A, which responds with an ACK message. User A and User B are then in conversation through an RTP media session.

Suppose User B decides to park the call. User B parks the call at the park server by sending a REFER message to the Park Server. A REFER message, as defined in Sparks, R., "The Session Initiation Protocol (SIP) Refer Method," RFC 3515, which is incorporated herein by reference as if fully set forth in this description, indicates that the recipient (identified by the Request-URI) should contact a third party using the contact information provided in the message. Therefore, User B refers the park server to User A. The park server returns a 202 response message (indicating acceptance of the referred call) and the park server also sends a NOTIFY message to User B to inform User B of the state of the call, e.g., whether the call has been transferred to the park server. User B will then return a 200 response message to the park server.

The park server then sends an INVITE to A with a "replaces" header, which causes User A to replace User B in the RTP communication session with the park server. The replaces header is defined in Dean, R., Biggs, B. and R. Mahy, "The Session Initiation Protocol (SIP) 'Replaces' Header," draft-ietf-sip-replaces-03.txt, Mar. 2, 2003, which is entirely incorporated by reference herein, as if fully set forth in this description. User A responds with a 200 OK message and the park server sends an ACK message back to User A. Now, User A and the park server are in communication through an RTP media session. For example, User A is now on hold and the park server may simply play music over the RTP media session. Therefore, the call from the park server is accepted by User A, which causes User A to send a BYE message to User B, who responds to User A with a 200 OK message.

User B receives notification of the successful park from the park server through a NOTIFY response, and also receives a Call-ID in the application/sip body of the NOTIFY response message. User B will then return a 200 response message to the park server. The Call-ID identifies the call between the park server and User A so that User B now has information that can be used to retrieve the call.

In the example illustrated in FIG. 5, now User C wishes to retrieve the parked call. It is presumed that User C is at a different location from User B. Perhaps User B moved to the new location and at the new location, User B is a new user (e.g., User C) from the network's perspective. To retrieve the parked call, User C dials the call pickup number (e.g., Call-ID) that the park server issued in the NOTIFY message. This results in a call set-up process between the park server and User C. The park server sends a re-INVITE message to User A to change the RTP destination for User A from the park server to User C. The re-INVITE message references the existing communication session between User A and the park server so that User A knows that a modification of an existing session instead of an establishment of a new session is being requested.

User A then returns a 200 OK message to the park server, which returns a 200 OK message to User C. Subsequently, User C returns an ACK message to the park server, which returns an ACK message to User A, and the call is setup between User A and User C. User C has successfully retrieved the parked call from the park server.

After retrieval of the parked call, the RTP media session between the park server and User A can be terminated by an exchange of a BYE message followed by a 200 OK message. Either the park server or User A can initiate the termination. For example, after User C picks up the call, User A may then send a BYE message to the park server, which would respond with a 200 OK message.

While a call is parked or being picked up, the park server is in the call-signaling path at all times. Therefore, the park server may manage and control the call park and call pickup features. Thus, the exemplary embodiment provides control of the call-park/pickup feature to a service provider, for example. However, after the call has been picked up and an RTP media session has been established between the two users, the park server drops out of the signaling path. Now, signaling between the two users, such as User A and User C in FIG. 5, would proceed as normal SIP signaling, such as illustrated in FIG. 2 for example.

While exemplary embodiments have been described, persons of skill in the art will appreciate that variations may be made without departure from the scope and spirit of the invention. The true scope and spirit of the invention is defined by the appended claims, which may be interpreted in light of the foregoing.

What is claimed is:

1. In a network telephony system, a network element comprising:
    a first user agent operable (i) to receive from a first communication device a request for the first user agent to replace the first communication device in a communication session between the first communication device and a second communication device, and (ii) responsively, to replace the first communication device with the first user agent in the communication session with the second communication device; and
    a second user agent communicatively coupled with the first user agent, and operable (i) to receive from a third communication device a request to initiate a new communication session between the second communication device and the third communication device and (ii) responsively, to re-issue the request to the second communication device instructing the second communication device to communicate with the third communication device by initiating the new communication session.

2. The network element of claim 1, wherein the first user agent is further operable terminate the communication session between the first user agent and the second communication device upon a determination that the second communication device and the third communication device have established the new communication session.

3. The network element of claim 1, wherein the first user agent is further operable receive from the second communication device a request to terminate the communication session between the first user agent and the second communication device, and responsively, to terminate the communication session between the first user agent and the second communication device.

4. The network element of claim 1, wherein the second user agent is operable to re-issue the request to the second communication device instructing the second communication device to communicate with the third communication device by providing the request to the first user agent, the first user agent being further operable to re-issue the request to the second communication device.

5. The network element of claim 1, wherein the first user agent and the second user agent are session initiation protocol (SIP) user agents, and the network element is a back-to-back user agent.

6. The network element of claim 5, wherein the first user agent uses SIP to communicate with the first and second communication devices, and the second user agent uses SIP to communicate with the third communication device.

7. The network element of claim 6, wherein the request received by the first user agent from the first communication device comprises a request to park the communication session between the first communication device and the second communication device at the network element, and wherein the first user agent is operable to responsively replace the first communication device in the communication session with the second communication device by parking the communication session, thereby establishing a parked communication session between the first user agent and the second communication device.

8. The network element of claim 7, wherein the request to park the communication session comprises a SIP REFER message.

9. The network element of claim 7, wherein upon establishing the parked communication session, the first user agent is further operable to send to the first communication device a notification of a successful park, the notification including a call-pickup number.

10. The network element of claim 9, wherein the request received by the second user agent from the third communication device comprises a request to pick up the parked communication session.

11. The network element of claim 10, wherein the request to pick up the parked communication session includes the call-pickup number.

12. The network element of claim 7, wherein the first user agent is operable to replace the first communication device in the communication session with the second communication device by sending to the second communication device a SIP REPLACES directing the second communication device to communicate with the first user agent.

13. The network element of claim 12, wherein the first user agent is further operable to communicate with the second communication device through an RTP media stream.

14. The network element of claim 6, wherein the first user agent is further operable to send a SIP BYE message to the first communication device in order to terminate the communication session between the first user agent and the second communication device upon a determination that the second communication device and the third communication device have established the new communication session.

15. The network element of claim 6, wherein the first user agent is further operable receive from the second communication device a SIP BYE message to terminate the communication session between the first user agent and the second communication device, and responsively, to terminate the communication session between the first user agent and the second communication device.

16. The network element of claim 1, wherein the network element comprises a park server.

17. The network element of claim 5, wherein the back-to-back user agent comprises a SIP-based park server.

18. The network element of claim 16, wherein the park server is operable to authorize the first communication device for parking the first communication session.

19. The network element of claim 17, wherein the SIP-based park server is operable to authorize the first communication device for parking the first communication session.

* * * * *